INVENTOR
ANTHONY L. CRESCI
PAUL A. CRESCI

ATTORNEYS

United States Patent Office 3,103,291
Patented Sept. 10, 1963

3,103,291
LOAD CARRYING VEHICLE
Anthony L. Cresci and Paul A. Cresci, both of
Boulevard and Grape Sts., Vineland, N.J.
Filed Dec. 23, 1960, Ser. No. 78,174
2 Claims. (Cl. 214—512)

This invention relates to vehicles for loading, unloading, and transporting relatively heavy loads, such as concrete blocks, cases containing ammunition, and other military supplies, particularly with respect to the loading and unloading of airplanes. The vehicle is adaptable for other uses which necessitate load transfer at different heights. For this purpose mechanism is provided for elevating and lowering the body. The vehicle body also includes an overhead trolley with which is associated load lifting apparatus designed to transfer loads longitudinally of the vehicle.

One of the objects of the invention is the provision of a fluid operated high-lift mechanism for moving the load carrying body vertically, together with apparatus operable independently of the lift mechanism for elevating a load vertically from the floor of the body and moving the load in a horizontal direction.

Another object of the invention is to provide supporting means for an overhead trolley such that obstruction to loading or unloading from the sides of the vehicle is minimized.

It is a further object of the invention to provide ground engaging bracing means for the body comprising vertically adjustable posts designed to extend laterally outwardly of the body and horizontally swingable to a position inwardly of the sides of the body.

Other objects will be apparent from the following description of a preferred embodiment of the invention taken with the accompanying drawings, in which FIG. 1 is a side elevation of the vehicle with the body in its elevated position and the load positioned at the outer end of the trolley to extend into a plane;

FIG. 5 is a sectional view of the trolley and traveling lift transfer mechanism employed in the apparatus.

Figure 1:
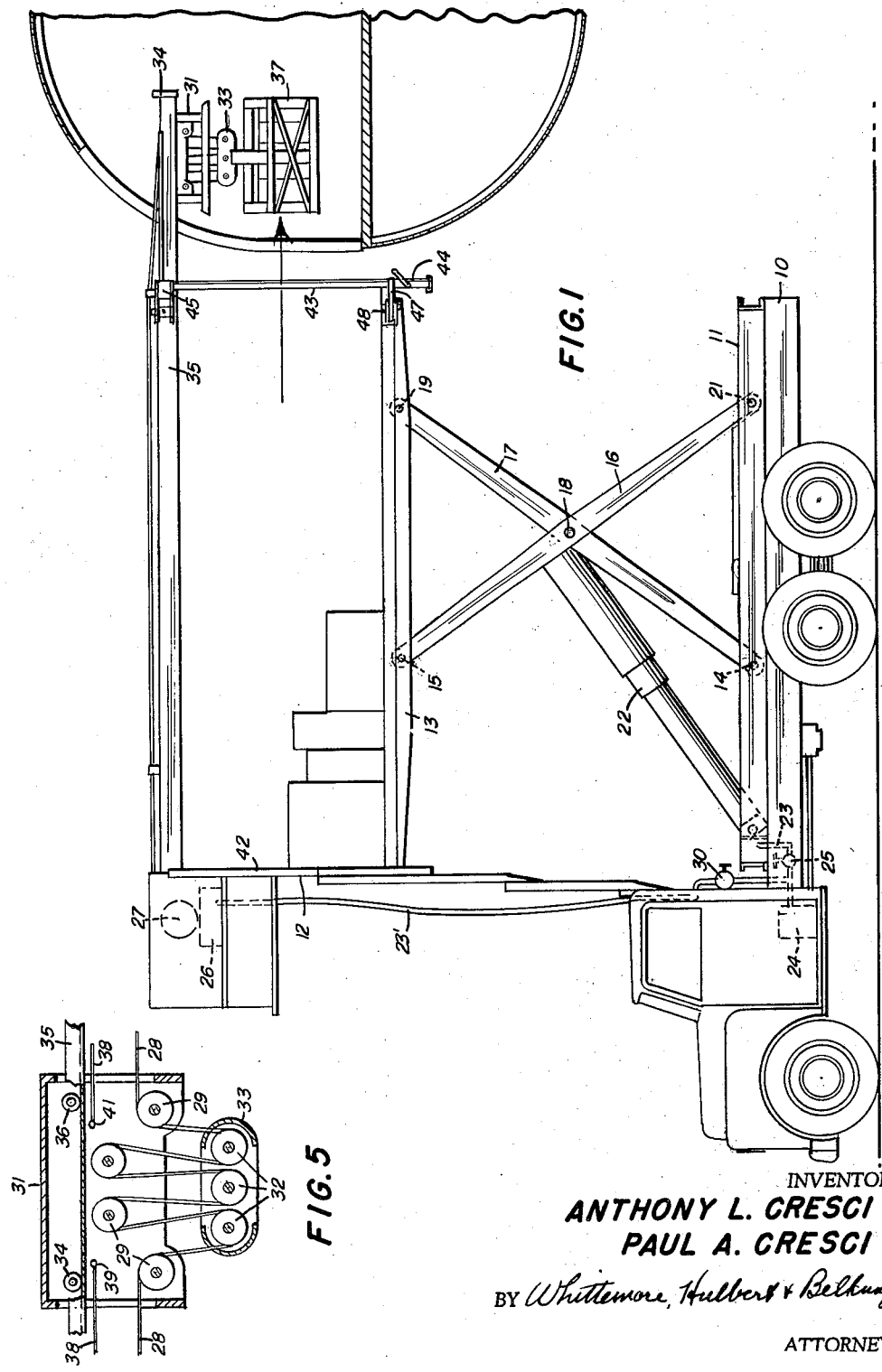
Figure 2:
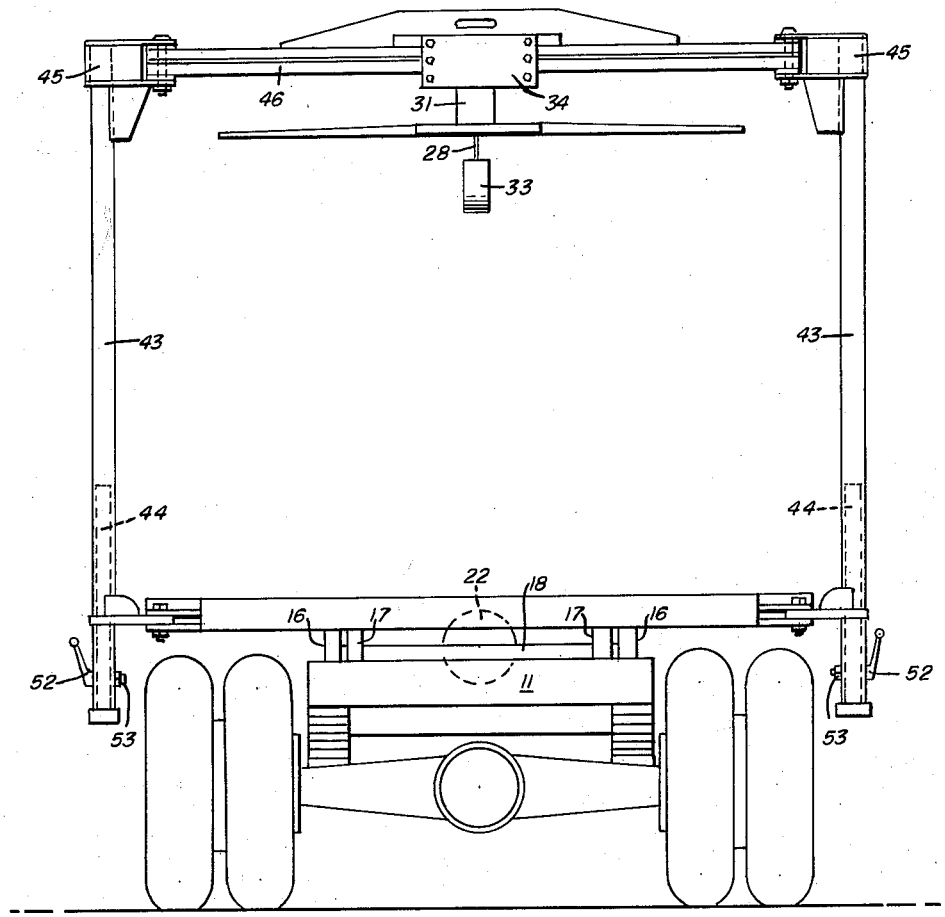
FIG. 2 is a rear view of the vehicle shown in FIG. 1.

Referring to the drawings, the vehicle chassis 10 includes guides or tracks 11 similar to those illustrated in the patent to Cresci No. 2,899,172. The body 12 is also provided with tracks 13, the tracks on the chassis and body accommodating rollers 14, 15 at the ends of crossed arms 16, 17, these arms being pivotally connected at 18 intermediate their ends. The arms are also pivotally connected to body 12 and chassis 10 at 19 and 21, respectively. A hydraulic ram 22 is supplied through conduit 23 with fluid from suitable pump means 24 driven by the engine of the vehicle to raise body 12 with respect to chassis 10. Valve 25 controls the flow of fluid to the ram.

Conduit 23', also in communication with pump 24, conducts fluid to a fluid operated motor 26 which drives a pair of axially aligned drums 27, only one of which is shown, suitable clutch and reversing means being provided to drive the drums independently of each other and each in opposite directions. Flow of fluid to motor 26 is controlled by valve 30. Attached to one of the drums is one end of a cable 28 which is trained over a series of pulleys 29, journaled in frame 31, and pulleys 32, journaled in frame 33. The other end of cable 28 is secured to member 34 at the opposite end of overhead track 35. Frame 31 is supported by rollers 36 movable longitudinally along the overhead track. Cage 37 is pivotally attached to frame 33 and is designed to hold material being transferred. Cable 38 is wound through a plurality of turns around the other of the drums, its ends being fastened at 39 and 41 to frame 31.

It will be apparent that by rotating the drum to which cable 38 is secured either clockwise or counterclockwise, frame 31 may be moved forwardly or rearwardly along the overhead track. Rotation of the other of drums 27 in one or the other direction will increase or decrease the length of cable 28 between the drum and the fixed end of the cable, thus lowering or elevating frame 33. Hence the trolley device can be moved forwardly or rearwardly of the track to position a load either on the vehicle body, on the ground level, or, as shown in FIG. 1, in an elevated storage space such as that in the body of an airplane. It is obvious that the body may be loaded or unloaded when in its lowered or elevated positions and that the load may be brought to rest on the body at any location between the forward and rear ends of the body floor. If, for instance, a load resting at ground level is to be transported some distance to an airplane, the storage space of which is at an elevated height above the ground, the frame 33 and its depending cage or grapples are first moved rearwardly to the end of track 35 extending beyond the rear of the body, the body having been lowered to rest on the chassis. The load is then positioned on the cage, lifted from the ground and above the body floor, the trolley apparatus operated to carry the load to a desired position over the floor upon which it is then deposited by the lowering of the cage. The vehicle is driven to its selected destination where the high lift mechanism raises the body to the level of the storage space, the cage or grapple and trolley sequentially elevated and traversed along the overhead trolley to deposit its load in the storage space into which the rearwardly extending end of the overhead track extends. It will be understood that the operations described are reversed when loads are transferred from an elevated level to one which is lower.

While it is intended that the body elevating mechanism and the mechanism for hoisting frame 33 as well as the cable controlling longitudinal movement of the hoisting frame along track 35 be sequentially actuated, it is apparent that each is under selective control and, if necessary, one or the other of drums 27 may be operated simultaneously with the body elevating mechanism.

Under some circumstances it is necessary to provide bracing laterally of the vehicle when the body is at ground level and, for this purpose, vertically adjustable posts are associated with the rear corners of the vehicle body. Regulatory road laws demand that the maximum widths of vehicles be maintained within certain fixed limits. For this reason accessories extending laterally from the body are included in overall width of a vehicle. In order to utilize maximum floor space and body width the present vehicle is provided with bracing struts or posts which are laterally swingable beyond the sides of the vehicle during loading or unloading operations. These posts are also adjustable vertically to provide adequate bracing on each side of the vehicle where uneven ground is encountered. It will be seen that the overhead track is supported by forward struts 42 and rear struts 43, the latter being tubular to accommodate telescopically posts 44. Rear struts 43 are rigidly secured at their upper ends to brackets 45 hingedly connected to beam 46. A similar beam supports the forward end of the overhead track as well as motor 26 and drums 27. The rear struts are each rigidly connected to an arm 47 hinged to spaced plates 48 on the floor of the body adjacent the sides thereof. The rear struts are provided with holes 49 adjacent the lower ends thereof, while posts 44 have a series of vertically aligned openings 51. Depending on the nature of the ground, the posts are lowered into ground engaging position and held thereat by pins 52 passing through holes 49 and those of holes 51 which most nearly register with holes 49. Welded to struts 43 are nuts 53 with which threaded end portions of pins 52 cooperate to prevent accidental withdrawal of the pins.

Figures 3, 4:
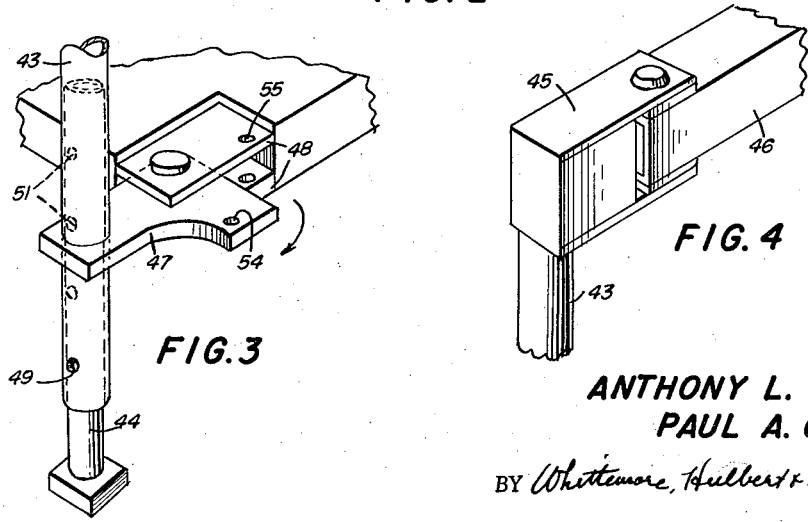
FIG. 3 is a fragmentary perspective of a lower support for a swingable bracing post.
FIG. 4 is a fragmentary perspective of an upper support for the bracing post.

As shown in FIGS. 3 and 4, the struts 43 and posts 44 extend outwardly and laterally from the sides of the vehicle and in this position they function as braces or side supports for the body floor as well as for the end beam supporting the overhead track. When so disposed they extend beyond the sides of the body thus offering no obstruction to loading and unloading endwise of the vehicle. When not in use as braces the posts are raised and locked to the struts, the struts then being swung inwardly to lie within the projected sides of the vehicle. They are retained in this relation by suitable pins passing through openings 54, 55 in arms 47 and plates 48 respectively.

Although a preferred form of the invention has been illustrated and described, it is to be understood that such changes as fall within the terms of the appended claims are contemplated.

What is claimed is:

1. A load carrying vehicle comprising a chassis, a body overlying said chassis, body elevating mechanism comprising a pair of arms pivoted to each other intermediate the ends of said arms, said arms being connected to said body and said chassis, a hydraulic ram including a piston connected to one of said arms for elevating said body in parallel relation to said chassis, a track supported by said body, said track being disposed above said body in spaced parallel relation and extending longitudinally thereof, hoist mechanism supported by said track, said hoist mechanism including a first load carrying frame and a second frame movable along said track, pulleys journaled in said frames, drums, a cable trained around said pulleys and attached to one of said drums and one end of said track, said one drum being adapted to wind and unwind said cable to raise and lower said load carrying frame, a second cable attached to said load carrying frame and to the other of said drums for moving said carrying frame longitudinally on said track, a hydraulic motor for rotating said drums, single pumping means for supplying fluid under pressure to said ram and said motor, and valve means controlling flow of fluid to said motor independently of the supply of fluid to said ram.

2. A load carrying vehicle as claimed in claim 1 in which said motor is disposed adjacent said track and said pumping means is disposed on said chassis, and a flexible conduit connecting said motor to said pumping means when the body is in any spaced relation to said chassis.

References Cited in the file of this patent

UNITED STATES PATENTS

| | | |
|---|---|---|
| 2,177,525 | Henderson | Oct. 24, 1939 |
| 2,379,094 | Maxon | June 26, 1945 |
| 2,504,232 | Smith | Apr. 18, 1950 |
| 2,537,755 | Harbaugh | Jan. 9, 1951 |
| 2,574,473 | Getz | Nov. 13, 1951 |
| 2,646,180 | Schlough | July 21, 1953 |
| 2,797,826 | Kuhlenschmidt | July 2, 1957 |
| 2,906,413 | Minty | Sept. 29, 1959 |
| 2,918,181 | Hanson | Dec. 22, 1959 |
| 2,935,218 | Fritz | May 3, 1960 |